United States Patent [19]

James

[11] 4,026,489

[45] May 31, 1977

[54] QUICK THREADING MAGNETIC TAPE REEL

[76] Inventor: Larry D. James, 9192 Ellsworth, Huntington Beach, Calif. 92646

[22] Filed: May 21, 1976

[21] Appl. No.: 688,539

[52] U.S. Cl. .............................................. 242/74.2
[51] Int. Cl.² ....................................... B65H 75/28
[58] Field of Search .................. 242/74, 74.1, 74.2

[56] References Cited

UNITED STATES PATENTS

| | | | |
|---|---|---|---|
| 1,385,191 | 7/1921 | Spaulding | 242/74.2 |
| 2,450,517 | 10/1948 | Koppel | 242/74.1 |
| 2,801,811 | 8/1957 | Dale | 242/74.1 |
| 3,159,358 | 12/1964 | Joiner | 242/74.1 |
| 3,233,842 | 2/1966 | Grafton | 242/74.2 |
| 3,250,487 | 5/1966 | Ligon | 242/74.2 |

*Primary Examiner*—Edward J. McCarthy
*Attorney, Agent, or Firm*—Grover A. Frater

[57] ABSTRACT

A reel for tapes and film strips is formed with a hub which extends between a pair of flanges. A section of the surface of the hub is moveable relative to the remainder of the hub so that the end of a tape or film strip can be inserted between the removeable and the remaining portion, there to be clamped whereby winding of the tape on the reel is facilitated. In one form of the invention that separable section is hinged so that it can be tilted and removed from the space between the flanges through a window in one of the flanges. In another form of the invention, the removeable section of the hub surface has the form of a clamp which is cammed to open and closed to position by movement radially relative to the hub.

20 Claims, 14 Drawing Figures

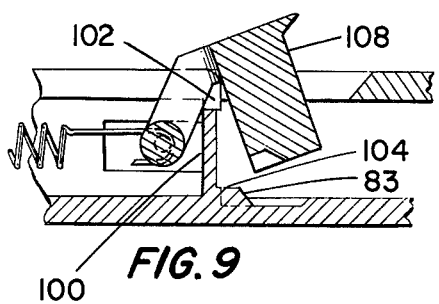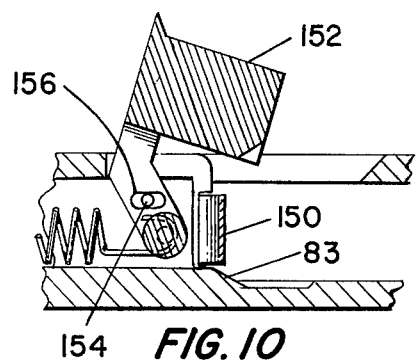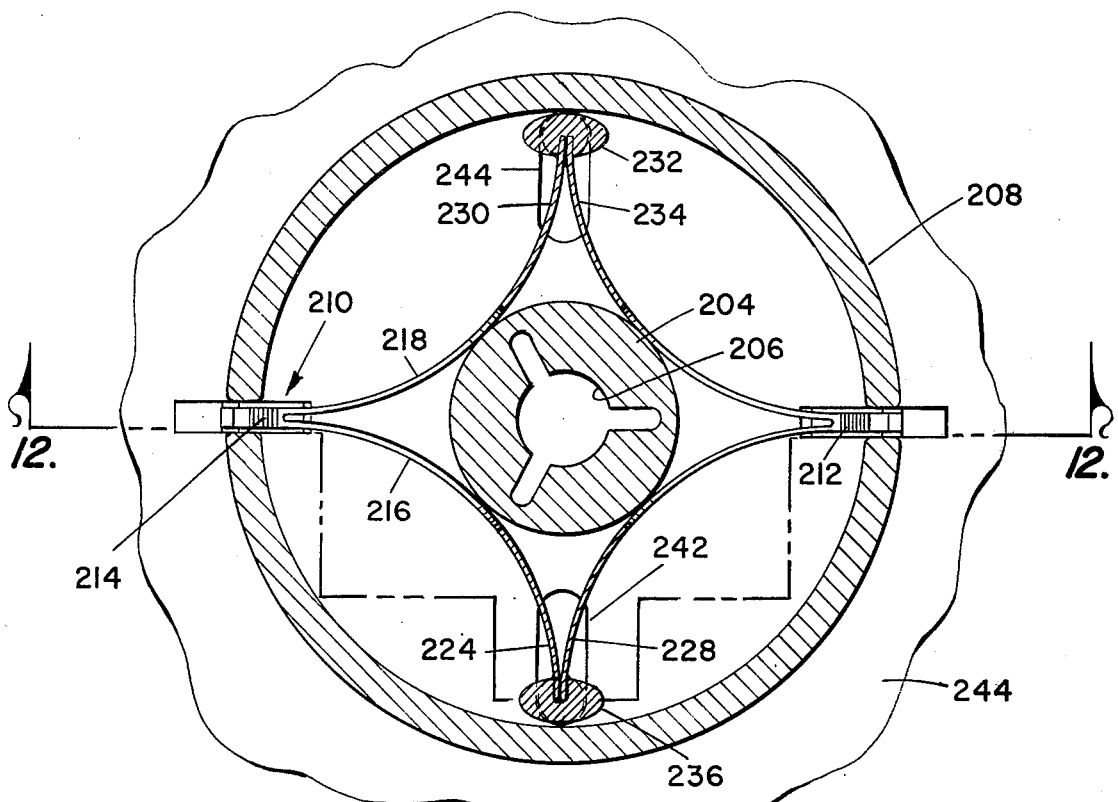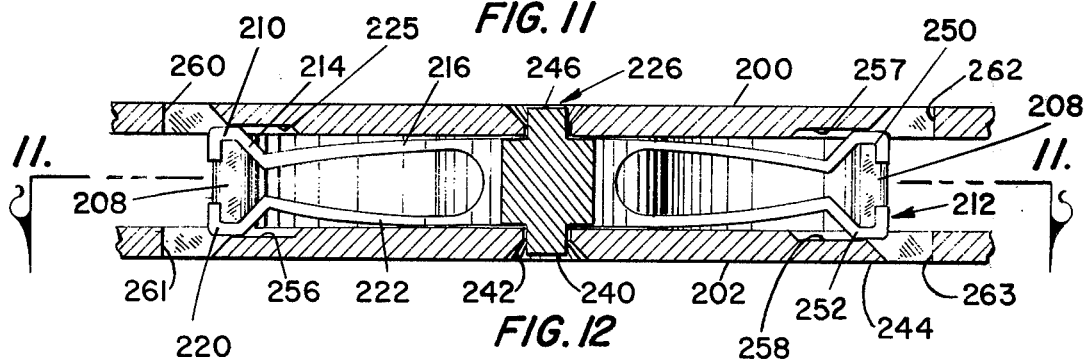

QUICK THREADING MAGNETIC TAPE REEL

This invention relates to improvements in tape reels. It is applicable to reels upon which to wind magnetic tapes, film strips, and other forms of tapes and strip materials, and the term "tape" is used to designate all or any of those forms.

BACKGROUND OF THE INVENTION

Tape reels commonly comprise a hub which is cylindrical in form and which extends between a pair of flanges, one at each end. The hub has a length only a little longer than the width of the tape that it is to accommodate. In practice, the diameter of the flanges is often twice as great, or more, than the diameter of the hub, and the difference in diameters usually exceeds the distance between the two flanges three or four times, or more. The effect of those dimensional relationships is that it is difficult, or even impossible, for a user of tape reels to reach down into the space between the flanges to the hub. That has made it difficult to secure the tape to the reel in a manner that will prevent relative movement between tape and the hub until a few turns of the tape have been wound upon the hub.

In general, if relative motion between the end of the tape and the hub can be prevented until several turns of the tape have been wound upon the hub, the pressure of subsequent turns of tape is sufficient to insure frictional engagement between the hub and the tape so that slippage is prevented. However, magnetic tapes and films are usually made of materials whose surfaces exhibit a low coefficient of friction, and to start the winding has been a continuing and serious problem. One inexpensive solution has been to form the hub with slots that extend over the length of the hub and are accessible from the ends of the reel through openings formed in the flanges. That arrangement works and is commonly employed in inexpensive reels. However, it is not a satisfactory solution, because, in most instances, the tape must be held manually in that slot while the reel is rotated several times, usually with the other hand.

There are certain cases in which it is possible to fix a stop structure on the end of the tape and to insert that into a stop-receiving opening in the hub. That solution is not available if the tape must be free to run off the reel as an insurance against damage of the tape, or otherwise. In practice, most applications preclude the use of a stop or other positive fastening element.

An alternative to placing the end of the tape loosely in a slot is to hold the tape in a clamp which operates by frictionally engaging the tape with a pressure insufficient to prevent the tape from pulling free, but which exerts enough frictional force to permit commencement of the winding without manual operation beyond the original clamping action. A variety of complex clamping structures have been proposed. The art of plastic forming is sufficiently advanced so that complexity alone is not a deterrent to successful operation. However, complexity has brought dissymmetry. Structural arrangements that move the center of gravity of the unit away from its geometrical center, and which tend to increase the moment arm of inertia, are not satisfactory for incorporation in reels that are to be used in those cases where the angular momentus of the reel and the system "WOW" must be held to a minimum.

One of the major difficulties with prior designs is that they fail to insure that the hub surface is truly cylindrical once the tape is clamped in place. Out-of-round conditions are magnified as more and more tape is wound upon the reel. As the reel is filled, out-of-roundness in the stored tape results in ever increasing displacement of the centroid form the rotational axis of the reel. The ultimate result is loss of fidelity and a reduction in usefulness of such reels for music reproduction and for high-speed data storage and recovery applications.

Another difficulty with prior designs is that they require weak flanges with radial splits or large openings which expose the tape edges.

The major problem with prior designs is that they are difficult, slow, uncertain, and cumbersome to attach a tape to in preparing for winding.

SUMMARY OF THE INVENTION

It is an object of the invention to provide improved tape reels to which the end of a tape is easily and conveniently clamped. It is an object to provide clamping reels that are improved in the sense that they may be readily manufactured in a form that preserves symmetry so that the centroid of the unit, whether filled with tape or not, remains at the rotational axis of the wheel whereby the reel imposes minimum adverse affect upon fidelity, or dynamic balance.

It is a further achievement and an object of this invention to provide a tape reel with smaller openings in the flanges thus providing more protection for tape stored on the reels.

Another achievement of the invention is the speed at which the tape reel can be threaded with tape prior to winding.

These and other objects and advantages of the invention which will hereinafter appear are realized in part by the provision of a reel having a central hub extending between end flanges and arranged so that one surface section of the hub is separable of the hub whereby the end of a tape, or a section of tape near the end, may be interposed between them. To that is added a means for urging the separable section of the hub back to its original position such that the cylindrical nature of the hub is preserved notwithstanding that an end section of a tape is clamped to the hub. In one preferred form of the invention, the separable section of the hub forms a cordal section and it is separated from its original position by being tilted about a tilt axis that extends in a plane parallel with the plane of the flanges. Projections extending along the surfaces between which the tape is clamped are arranged so that the tape is centered, in the direction of its width, between the flanges whereby the centroid of the tape filled reel remains at the geometrical center of the structure. In one modification of that preferred embodiment, a dual spring biasing system insures that an adequate frictional force is applied to the tape to insure that the tape end is firmly held for fast-start winding operation.

In another preferred embodiment, the separable section of the hub is moved axially of the hub perpendicular to its rotational axis to form an entry space and a clamping space for the tape rather than to have the separable portion pivotally mounted on the reel.

THE DRAWING

Figure 1:
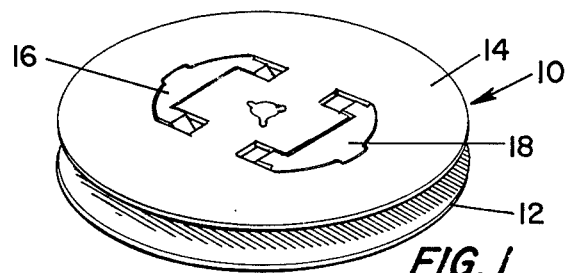
FIG. 1 is an isometric view of a tape reel embodying the invention.
Figure 5:
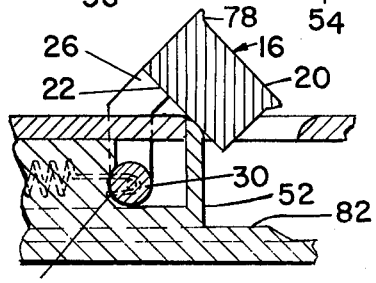
Figure 6:
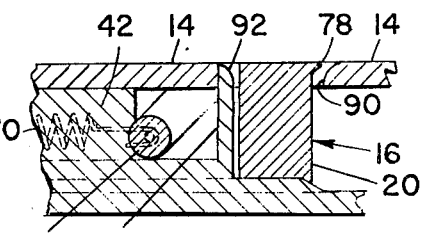
Figure 7:
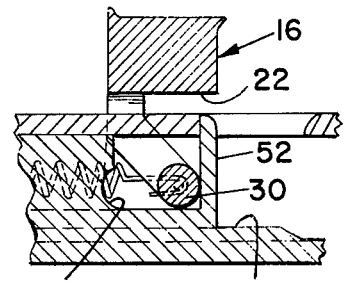
Figure 8:
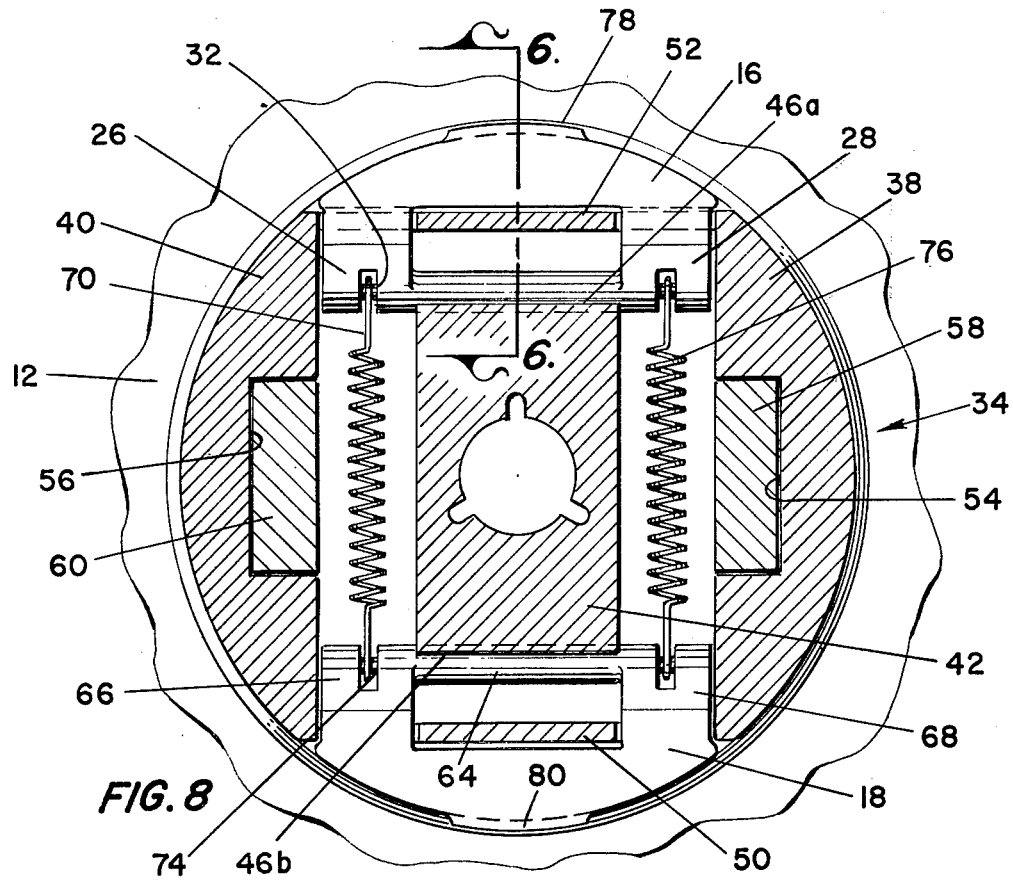
Figure 13:
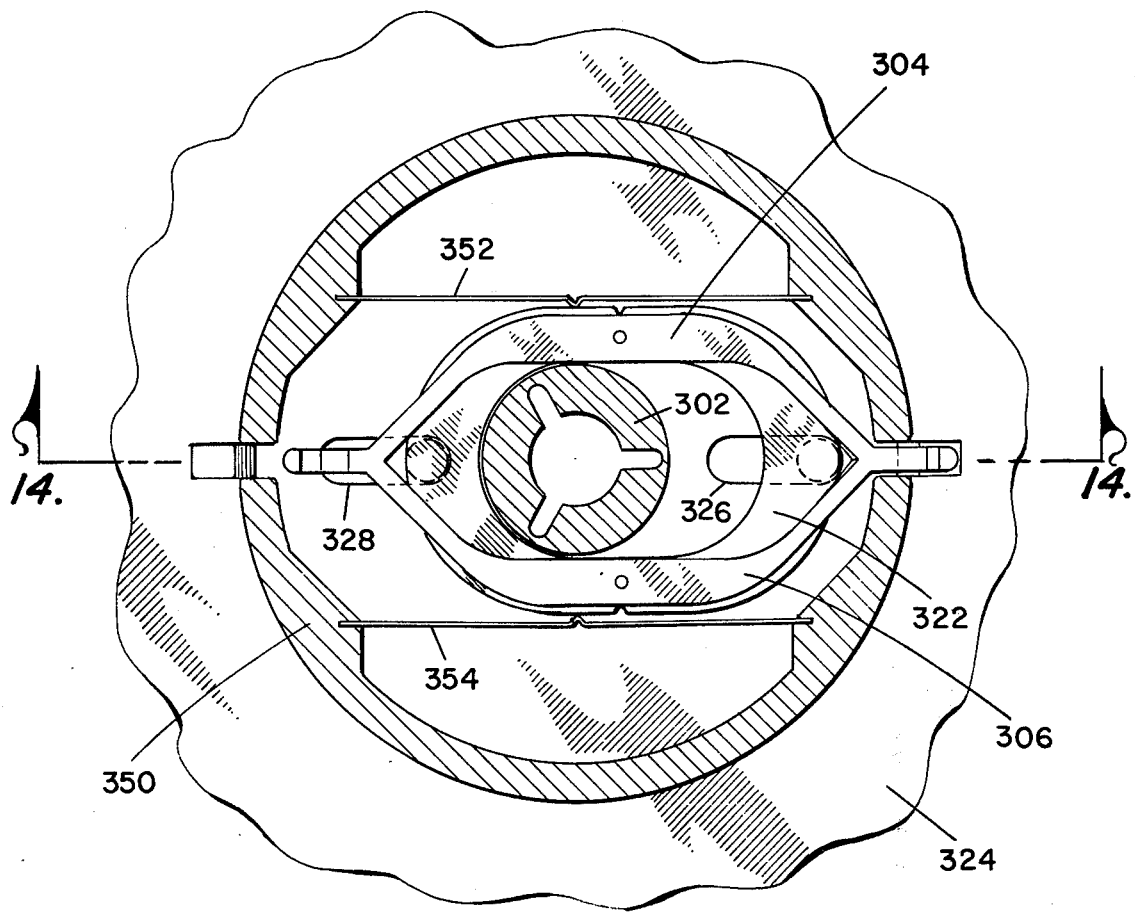
Figure 14:
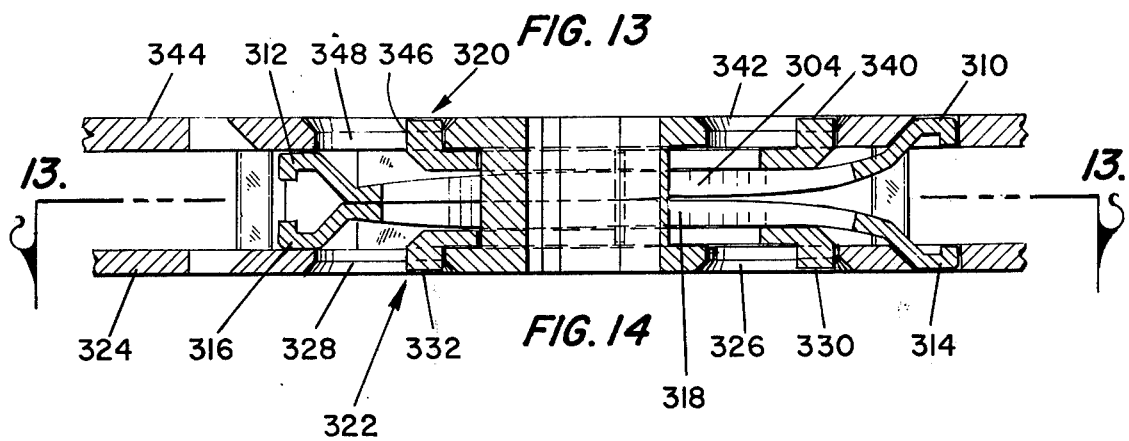

FIGS. 5, 6, and 7 are cross-sectional views of a fragment of the reel of FIG. 1, the section line being taken on line 6—6 of FIG. 8;

FIG. 8 is a section view taken on a plane parallel to the flanges of the reel located midway between them, except that the separable sections of the hub, and the bias springs that hold them in place, are shown in top plan view;

FIGS. 9 and 10 are cross-sectional views showing modifications of the structures shown in FIGS. 5, 6, and 7;

FIG. 11 is a cross-sectional view of a fragment of an alternative form of reel taken on line 11—11 of FIG. 12;

FIG. 12 is a cross-sectional view of a fragment of the reel shown in FIG. 11 taken on the meandering section line 12—12 of FIG. 11;

FIG. 13 is a cross-sectional view of a fragment of still another form of reel according to the invention taken on line 13—13 of FIG. 14; and FIG. 14 is a cross-sectional view of the reel shown in FIG. 13 taken on line 14—14 of FIG. 13.

DESCRIPTION OF THE ILLUSTRATED EMBODIMENTS OF THE INVENTION

Figure 2:
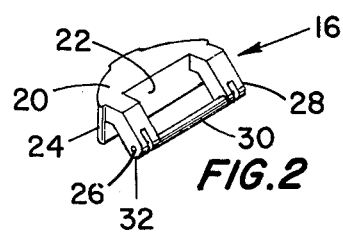
FIG. 2 is an isometric view of one of the separable hub surface sections employed in the reel of FIG. 1.

The reel 10 shown in FIG. 1 consists of a lower flange 12, an upper flange 14, and a hub, the two separable portions of which are visible in FIG. 1 through windows formed in the upper flange 14. Those hub sections are designated 16 and 18, respectively. The hub section 16 is shown in perspective in FIG. 2. It comprises a portion 20 whose rearward side 22 is substantially flat and whose forward side 24 forms a segment of a cylinder. When assembled in the reel, portion 20 comprises a separable section of the surface of the hub which, in this embodiment, is a cordal section. A pair of arms 26 and 28 extend rearwardly and downwardly from the upper, outer margins of the rear surface 22. A cylindrical rod 30 extends between the arms at their outer ends, and that rod is pinned to the arms. The pin is visible in FIG. 2 where it is designated by the numeral 32. Each arm is slotted in the direction perpendicular to the axis of the pin so that the end of a biasing spring can be inserted in the slot and hooked over the pin 32. That construction is best seen in FIG. 8 where the two separable hub sections 16 and 18 are shown to be assembled with the remainder of the reel.

Figure 3:
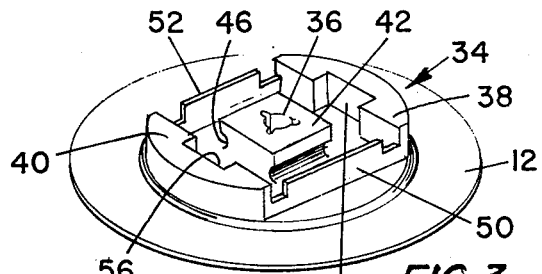
FIG. 3 is an isometric view of the lower flange and part of the hub structure of the reel of FIG. 1.

In FIG. 3, the lower flange 12 is integrally formed with a structure that forms part of the hub and which extends upwardly from the central area of the flange. The hub, which is generally designated by the reference numeral 34, can be described as a cylindrical element having a central opening 36 to receive a drive shaft and to have sections which are parallel and perpendicular to the axis of the drive opening 36 cut away from opposite sides of that opening to form a pair of channels in which a pair of tension springs are to be disposed. Those cutouts having been made, the hub structure 34 is divided into a pair of opposed side segments 38 and 40 which lie on opposite sides of a central, generally rectangular section 42.

The section 42 is made rectangular as a consequence of the hub 34 being formed with cutaways portions that extend parallel to the axis of the drive opening 36 and on opposite sides of that opening perpendicular to the previously described cutaway portion. The consequence of that construction is to provide a apsace into which the arms of the separable hub sections 16 and 18 may be disposed together with the cross rod that interconnects the arms of those sections. One of those rods was previously identified as rod 30 in FIG. 2. That rod fits into a complementally shaped cutout 46 which is formed in an end of the central block 42 in FIG. 3.

There is a cutout corresponding to cutout 46 at the other side of the central block 42, but it is hidden from view in FIG. 3 by a wall 50 which extends between the side segments 38 and 40 of the hub. There is a similar wall 52 at the opposite side of the structure. Those walls are notched adjacent to the side structures 38 and 40 to accommodate the arms of the separable hub sections. The upper surface of walls 50 and 52 serve as cam surfaces for their respectively associated separable hub sections. Thus, in operation of the completely assembled unit, the upper surface of wall 52 serves as a cam for cooperation with the rear surface 22 of the separable hub section shown in FIG. 2 when that hub section is pivoted outwardly through the upper flange 14 so that a portion of the tape may be passed between the flanges and against the outward surface of the wall 52 in the manner to be described below.

Figure 4:
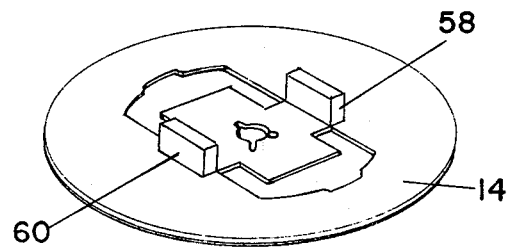
FIG. 4 is an isometric view of the upper flange of the reel of FIG. 1 shown with the bottom side of the flange extending upwardly.

The inner surfaces of the two hub sections 38 and 40 are formed with notches 54 and 56, respectively, to accommodate a pair of complementally formed projections 58 and 60, respectively, which are integrally formed with the upper flange 14 and which extend downwardly (upwardly in FIG. 4) into the cutouts 54 and 56 when the upper flange is assembled with the lower flange and hub structure as it is shown to be in FIG. 1.

The manner in which those several components are associated is best shown in FIG. 8. The cutout 46 is hidden from view in FIG. 8, but it is represented by the dashed line 46a. The corresponding cutout at the opposite side of the central block 42 is represented by the dashed line 46b. The rod 64, which extends between arms 66 and 68 of separable cam section 18, fits into that cutout. The two separable sections 16 and 18 are held in place with their rods 30 and 64 lodged in their respectively associated cutouts of the central block 42, by a pair of coiled extension springs. Those springs are formed with hooks at either end. The hook at one end of the spring 70 is hooked over pin 32 of section 16. The hook at the other end is hooked over pin 74 of the section 18. In like manner, the ends of the other spring 76 are hooked over pins 32 and 74.

At its upper, forward surface, each of the separable hub sections 16 and 18 is provided with a forwardly extending lip the purpose of which is to permit the user to lift the section through the flange window to the position shown in FIG. 5 or 7, or intermediate positions, so that a tape may be drawn toward the hub between the upper and lower flanges whereby the tape lies flat against the outer surface of wall 50 or 52. The flange on section 16 is designated 78 and the flange on section 18 is designated 80.

Returning to FIG. 4, the windows through which the sections 16 and 18 are to be lifted are generally C- shaped. The windows are arranged so that the open portions of the C shapes face one another.

In FIG. 6, the member 16 occupies the same position that it does in FIGS. 1 and 8. The forward portion 20 is positioned within the reel so that it forms a part of the cylindrical hub. Its rear surface 22 is flush against the forward face of the wall 52. It is held there by the action of spring 70 pulling on the pin 32 that extends through the rod 30. In the preferred form, the dimensions of the rods are such that the surface of the rod toward the center of the reel almost engages a wall of cutout 46. The upper edge of wall 52 is rounded to form a cam surface that co-acts with the rear surface 22 of the element 20. The window of the upper flange 14 is arranged so that one of its edges abuts the rear face of the wall 52. That feature is visible in each of FIGS. 5, 6, and 7, and the interaction between the cam surface at the upper end of wall 52 and surface 22 of the element 20 can be seen in FIG. 5.

To lift the separable cam section 16 from the reel so that a portion of the tape can be inserted and clamped to the reel, one need only place a fingertip in the space between lip 78 and the wall 90 adjacent to the lip. Lifting the section by the lip, it is forced to rotate about a floating axis which initially is substantially coincident with the axis of the rod 30. As the section 16 is lifted, its rear face 22 slides over the rounded upper edge 92 of wall 52 until the section has been retracted sufficiently to receive a tape section. At this moment a portion of tape is pulled between the flanges and tensioned against wall 52. Then the separable cam section 16 is pushed back inside over the tape section. The user can withdraw the excess tail end of the tape and begin winding with a slack tape. When tape is passed between the flanges and pulled into contact with wall 52 the moveable hub element 16 is pushed into clamping position as shown in FIGS. 6 and 8.

As hub element 16 is moved into position its pivot arms 26 and 28 will contact the edge of the tape and automatically center and align the tape thus aiding it to begin winding at the center of the cylindrical winding surface.

The arms 26 and 28 act in cooperation with at raised surface 82 at the edge of wall 52 and form a part of the lower flange to center and align the clamped tape portion. This raised surface or tape guide 82 is bevelled down to the lower flange surface in order to allow the tape portion to slip by it without snagging.

One important accomplishment of all this is to insure that the moveable element 16 has a solid support (the clamped tape) and that the load (convolutions of tape) is positioned directly over that support. This is to insure that the hub components form a perfectly cylindrical and solid winding surface or structure.

There are two diametrically arranged separable hub surface sections. In the preferred embodiment, they both are rotatable away from the hub through the same flange toward the same side of the reel. That arrangement makes it easy to achieve dynamic balance of the structure. That is not entirely essential. The structure could be arranged so that the two sections could be pivoted out to opposite sides of the reel. That kind of an arrangement would permit making the unit of entirely reversible parts. In the embodiment of FIG. 1, the two hub sections 16 and 18 can have identical shape and size, but the upper flange structure differs substantially from the lower flange structure. If the removeable hub sections were made to hinge to opposite sides of the reel, it would be possible to design a single structure forming one flange and half of the hub so that two of them would interfit to form the fixed hub portions and the flanges. That arrangement has the advantage that it permits saving in the cost of tooling to produce the unit, and it results in a universal reel that can be located from either side. Arranging the distribution of mass so that the centroid falls at the geometric center is no more difficult than it is in the case of the embodiment shown in FIG. 1.

Since two retractable sections are employed, and since a tape end is ordinarily associated with only one of them, it will be apparent that the distance from the center of mass of one separable hub section will be displaced from the axis of rotation more than the other by an amount equal to the thickness of the tape that is associated with that section. Since the thickness of modern tapes is so small, this presents no problem with dynamic balance or vibration. However, this small displacement is easily overcome as illustrated in FIG. 9 by forming the wall of the hub section against which the tape is to rest with a recess. Wall 100 in FIG. 9 is shown to have such a recess at its outer face. That recess can be thought of as the space between an upper projection 102 and a lower projection 104. In this embodiment, the rear face of the hub element 108 serves as a cam follower in the same manner as does the surface 22 in FIGS. 1 through 8. However, the camming surfaces can be otherwise arranged, and in that case, the projections that operate to form the recess in which the tape can be housed may be formed in the rear face of the separable hub section or they could be arranged so that one of the projections appears on the stationary part of the structure and the other on the moveable part of the structure. Any of those arrangements is possible. The point is that it is easy to provide a slot or a recess whose depth is only slightly more than the thickness of the tape to be accommodated therein. This embodiment provides tape clamping between surfaces 104 and the inside surfaces of the hinge arms.

The unit shown in FIG. 10 is arranged so that it accomplishes the same result. In that figure, the forward wall is formed with an opening in which a leaf spring 150 is trapped. The leaf spring is arranged so that its central region is biased to a position forwardly of the wall, in its relaxed condition, so that there is ample pressure available for clamping against the tape when the hub section 152 is rotated on its pivot pin 154.

The unit in FIG. 10 differs from the others in that its arms are mounted upon a pin 154 which floats in a slot 156 provided in the stationary remainder of the structure. The pin extends through a slot 156 in the hub to achieve the effect of a floating pivot. The floating pivot is to allow the moveable element to seat properly and solidly.

In both of the embodiments shown in FIGS. 9 and 10, the lower flange has comformations in its upper face which complement conformations in the lower face of the sections 108 and 152, respectively. Those conformations are arranged so that as the tape is passed between the flanges and tensioned against the stationary structure, it is guided into the recessed space between the surfaces 102 and 104 by the tape guide 83. It is also pushed into the recessed space by the hinge arms of member 108 or member 152.

Another embodiment of the invention is shown in FIGS. 11 and 12. In this embodiment, the separable hub section comprises a clamp formed by a pair of fingers that are moveable relative to one another in a direction parallel to the rotational axis of the reel. There are two separable hub sections, of clamps, arranged at diametric points of the hub. The clamping structures are moveable from a position at which they form a part of the circumference of the hub to a position outside of the hub and beyond the hub. The two flanges of the reel are provided with conformations on their interior surfaces which serve as cams in cooperation with the exterior surface of the clamp such that the clamp is free to open when it is moved to a position without the hub and such that the clamp is forced to close when it is moved to a position at which it forms a part of the circumference of the hub.

The several parts of the structure are identified as follows. The numeral 200 designates the upper flange of the unit. The lower flange is numbered 202. The flanges are interconnected by a central circular hub 204 in which the drive shaft opening 206 is formed. That central hub portion 204 is cylindrical and has its axis coincident with the axis of the drive opening 206. Both flanges have their centers on that axis.

Member 204 is the drive hub. In this case, the hub on which the tape is wound is formed by a drum 208. That drum is a cylindrical tube. It extends between the flanges and has its axis coincident with the axis of the drive hub 204. The wall of the drum is opened at two diametric points. It is opened sufficiently to accommodate the two tape clamps 210 and 212. In preferred form, those clamps are made of a material that exhibits a substantial amount of resilience. They can be molded of plastic material. A comparison of FIGS. 11 and 12 will show that each clamp is biforcated twice. The construction can be envisioned by considering that the clamp is molded in the form of an elongated bar having rectangular cross-section in which the height of the section is substantially greater than the width of the section. the bar is bifurcated from one end to a distance approximately two-thirds of its length by being divided in the direction of the height of the bar. The result of that is visible in FIG. 12 where the upper and lower part of the bifurcated bar becomes the jaws of the clamp at the open end of the bar.

The bar is further bifurcated by being divided in the dimension of its width over the majority of its length beginning at the opposite end of the bar. The result of that is a structure having two similar C-shaped portions which are joined at the ends of the arms of the C adjacent its opening. The C shape may be seen in FIG. 12, but the two C members are spread apart at the ends at which they are separate to form the structure that is shown in FIG. 11. The result is that the jaw 214 is supported by, and is formed by, the two joined ends of arms 216 and 218. Jaw 220 is supported, and is formed by the joined ends of, two arms which lie directly below the support arms 216 and 218, respectively. One of those arms is visible in the drawing. It is arm 222 which lies below arm 216 and which cooperates with arm 216 to form the C-shaped element the rear portion 224 of which is clamped in a moveable operating member 226 along with the end 228 of a similar structure associated with the clamp 212. The rearward end 230 of the C-shaped arm is clamped in a similar operating member 232 along with the end 234 of the other C-shaped support structure associated with clamp 212. those operating structures comprise pins the ends of which extend through slots in the upper and lower flanges.

The ends of the members 232 and 226 are accessible from the exterior at each side of the reel. To make them more accessible, the slots 242 and 244, and the corresponding slots in the upper reel 200, are chamfered, as best shown in FIG. 12. The central region of member 232 and member 236 are larger in cross-sectional area so that they are trapped between the flanges.

To use the reel and its tape clamping element, one need only put a finger atop each of members 236 and 232 and force them together. That is most easily done with the thumb and forefinger of one hand. When it is done, members 232 and 236 move toward one another in their respectively associated slots in the two flanges. The arms on which the clamps are mounted are forced to slide over the outer surface of the center drive hub 204 and the arms force the clamps outwardly from the position they are shown to occupy in FIGS. 11 and 12. As the clamps are moved outwardly, the outer surface of the two jaws 210 and 220 on one side, and 250 and 252 on the other side, are moved beyond their respectively associated recesses 255, 256, 257, and 258, into a region beyond where there is an opening through both of the flanges into which the jaws, 210, 220, 250, and 252 may expand and are forced to expand by resilience in the arms on which they are fixed. Jaw 210 expands into opening 260; jaw 220 expands into opening 261; jaw 250 expands into opening 262; and jaw 252 expands into opening 263. The jaws are formed similar to those depicted in FIGS. 13 and 14. It will be apparent from an examination of those drawings that the jaws open sufficiently wide to permit the entry of a tape between the pairs of jaws so that the tape can lie against the tape hub 208. When the operating members 236 and 232 are released, the resilience of the arms of the clamps force the members 236 and 232 back to the positions they are shown to occupy in FIG. 11. As an incident to that action, the clamps are drawn back into their respectively associated recesses 255 through 258. The jaws are now clamped over a section of tape and that section is drawn back into the opening into which the clamp retreats.

The embodiment shown in FIGS. 13 and 14 utilizes a clamp and clamping action similar to the embodiment shown in FIGS. 11 and 12. This latter embodiment differs primarily in the structure by which the clamp is moved over the cam surfaces that make it open and close. In this case, the two clamps are interconnected by a pair of arms that straddle the center drive hub 302. Those arms are identified as an arm 304 and an arm 306. In this embodiment, the jaws of the two clamps are not integrally formed. Instead, the two upper jaws 310 and 312 are interconnected by arms 304 and 306, and the lower jaws 314 and 316 are interconnected by a separate pair of arms only one of which is visible in the drawings. It is seen in FIG. 14 where it is given the reference numeral 318. The two sets of arms are pinned together by pins. They are pinned to upper and lower actuating members 320 and 322. The lower one of those members is visible in FIG. 14. That member includes two buttons, one at each of its ends, which extend through slots formed in the lower flange 324. One of those slots is identified as a reference numeral 326 and the other by a reference numeral 328. Those same slots are visible in FIG. 14 where the operating button 330 is seen to reside in slot 326 and the operating button 332 is disposed in slot 328. That operating member 322 is pinned to the underside of the pairs of clamp arms. The other operating member 320 is identical, except that it is pinned to the upper side of the pairs of clamp arms. It includes an operating button 340 which is disposed in slot 342 of the upper flange 344. At its other end, the operating member 320 includes a button 346 which is disposed in slot 348 of the upper flange.

In the embodiment of FIGS. 13 and 14, the drum or tape hub 350 has a pair of leaf springs 352 and 354 extending across its interior. The springs are parallel with one another and they straddle the clamping structure and the operating members. The springs are formed with protusions that cooperate with detents in the sides of the operating members. The arrangement is such that the detents serve to hold the clamps in a position in which the ends of the clamps form part of the circumference of the tape hub 350.

Since the clamp elements in FIGS. 13 and 14 have fixed connection to one another, and since the length of the structure from the outside of one clamp to the outside of the other is equal to the diameter of the tape hub 350, one of the clamps is drawn within the hub when the structure is moved so that the other clamp extends beyond the hub. Thus, there are three positions for the clamps in this embodiment. In one position, the clamp extends beyond the hub; in another position, it forms part of the circumference of the hub; and the clamp is located within its hub in the third position.

Although I have shown and described certain specific embodiments of my invention, I am fully aware that many modifications thereof ar possible. My invention, therefore, is not to be restricted except insofar as is necessitated by the prior art.

I claim:

1. In a tape reel of the kind having a generally cylindrical winding hub and guide flanges fixed to its ends, the improvement which comprises:
   formation of the hub with a surface section separable from the remainder of the hub such that upon separation of such surface section a length of tape may be inserted between said surface section and the remainder of the hub;
   selectively operable clamping means for causing said surface section to be selectively clamped to the remainder of the hub whereby the hub is returned to substantially cylindrical condition, notwithstanding the presence of a length of tape between said surface section and the remainder of said hub; and
   said surface section comprising a cordial section of the cylindrical hub.

2. The invention defined in claim 1 in which said surface section has hinged connection to the remainder of said reel.

3. In a tape reel of the kind having a generally cylindrical winding hub and guide flanges fixed to its ends, the improvement which comprises:
   formation of the hub with a surface section separable from the remainder of the hub such that upon separation of such surface section a length of tape may be inserted between said surface section and the remainder of the hub:
   selectively operable clamping means for causing said surface section to be selectively clamped to the remainder of the hub whereby the hub is returned to substantially cylindrical condition, notwithstanding the presence of a length of tape between said surface section and the remainder of said hub;
   said surface section comprising a cordal section of the cylindrical hub and having hinged connection to the remainder of said real; and
   said hinged connection being made on an axis which lies on a plane perpendicular to the axis of the reel.

4. The invention defined in claim 3 in which said clamping means comprises a spring.

5. The invention defined in claim 4 in which the surfaces of said surfaces section and the remainder of said hub between which a length of tape may be inserted are formed to engage opposite sides of said tape.

6. The invention defined in claim 5 in which one of said surfaces comprises a spring free to flex toward and away from the other of said surfaces, the spring being normally biased to flex toward said other of said surfaces.

7. The invention defined in claim 5, in which one of said surfaces is formed with a projection extending toward the other of said surfaces along one longitudinal edge thereof, and in which one of said surfaces is formed with a projection extending toward the other of said surfaces along the other longitudinal edge thereof; said projections being spaced apart and being formed equidistant from a respectively associated one of said flanges whereby to form an elongated opening, rectangular in cross-sectional shape, in which a tape may be clamped in the mid-region of the hub between said flanges.

8. The invention defined in claim 5 in which one of said flanges is formed with an opening in the portion thereof that overlies said surface section whereby the surface section may be separated from the remainder of the hub by being rotated on its hinge through said opening.

9. The invention defined in claim 8 in which said hinge has floating connection to said hub.

10. The invention defined in claim 9 in which said hub is formed with a cam over which said surface section is slidable when pivoting about its hinged axis.

11. The invention defined in claim 8 in which said hub is formed with a second surface section like the first mentioned surface section, the second surface section being located at a diametric region of the hub; said flange being formed with a second opening overlying said second surface section; and opening overlying said second surface section; and said second surface section being mounted for hinged movement through said second opening in the flange.

12. In a tape reel of the kind having a generally cylindrical winding hub and guide flanges fixed to its ends, the improvement which comprises:
   formation of the hub with a surface section separable from the remainder of the hub such that upon separation of such surface section a length of tape may be inserted between said surface section and the remainder of the hub;
   selectively operable clamping means for causing said surface section to be selectively clamped to the remainder of the hub whereby the hub is returned to substantially cylindrical condition, notwithstanding the presence of a length of tape between said surface section and the remainder of said hub;
   said surface section comprising the clamp selectively moveable radially of said hub between points the first of which is substantially at the circumference of said hub and the second of which is without the surface of said hub.

13. The invention defined in claim 12 which further comprises means for opening the clamp to receive a tape when positioned without the surface of the hub and to engage the tape when the clamp is positioned at the circumference of the hub.

14. The invention defined in claim 13 in which the clamp comprises a pair of jaws and means for biasing the jaws apart;

said invention further comprising camming means in the form of surface confirmations in said flanges for camming said jaws toward one another when said clamp is moved toward said second position and for permitting said jaws to separate when the clamp is moved to said first position.

15. The invention defined in claim 14 which comprises a second clamp, like said first mentioned clamp, and second camming means, like said first mentioned camming means, for co-acting with said second clamp.

16. the invention defined in claim 15 in which said clamps are interconnected for movement together;

each of said clamps being moveable to a respectively associated third position within said hub whereby said clamps may be moved together such that one is without the hub while the other is within, and such that both can be moved to positions substantially at the circumference of said hub.

17. The invention defined in claim 16 in which said clamps are interconnected for movement together by a resilient element, said resilient element being normally biased to move both of said clamping means to positions substantially at the circumference of said hub and said resilient element being deformable manually to force each of said clamping means to a respectively associated first position without said hub.

18. In a tape reel of the kind having a generally cylindrical winding hub and guide flanges fixed to its ends, the improvement which comprises:

formation of the hub with a surface section separable from the remainder of the hub such that upon separation of such surface section a length of tape may be inserted between said surface section and the remainder of the hub;

selectively operable clamping means for causing said surface section to be selectively clamped to the remainder of the hub whereby the hub is returned to substantially cylindrical condition, notwithstanding the presence of a length of tape between said surface section and the remainder of said hub;

said surface section comprising a cordal section of the cylindrical hub and having hinged connection to the remainder of said reel; and said surface section having connection to the remainder of said reel on an axis which lies between said flanges and which lies in a plane parallel to the plane of said flanges and is contained within said hub.

19. The invention defined in claim 18 in which said clamping means comprises a spring.

20. The invention defined in claim 18 in which said axis is free to float;

said invention further comprising resilient means for biasing said hinged connection to a given initial position within said hub.

* * * * *